US006655438B2

(12) United States Patent
Trochon et al.

(10) Patent No.: US 6,655,438 B2
(45) Date of Patent: Dec. 2, 2003

(54) MACHINE FOR MACHINING AND DEFLASHING TIRES

(75) Inventors: Francois Trochon, Chamalieres (FR); Carlo Conzatti, Rovereto (IT); Giorgio Marangoni, Rovereto (IT)

(73) Assignee: Michelin Recherche et Technique S.A., Granges-Paccot (CH)

( * ) Notice: Subject to any disclaimer, the term of this patent is extended or adjusted under 35 U.S.C. 154(b) by 0 days.

(21) Appl. No.: 10/132,558

(22) Filed: Apr. 25, 2002

(65) Prior Publication Data

US 2002/0166641 A1 Nov. 14, 2002

(30) Foreign Application Priority Data

Apr. 26, 2001 (FR) .......................................... 01 05782

(51) Int. Cl.[7] .............................................. B29D 30/68
(52) U.S. Cl. .............................. 157/13; 83/869; 83/914
(58) Field of Search ............................. 157/13; 83/337, 83/549, 550, 914, 869

(56) References Cited

U.S. PATENT DOCUMENTS

| | | | | | |
|---|---|---|---|---|---|
| 3,426,828 | A | | 2/1969 | Neilsen | 157/13 |
| 3,953,915 | A | * | 5/1976 | Fawcett et al. | 407/46 |
| 3,977,131 | A | | 8/1976 | Searle et al. | 51/289 |
| 3,980,120 | A | * | 9/1976 | Fawcett et al. | 157/13 |
| 4,009,499 | A | * | 3/1977 | Casler et al. | 15/88.3 |
| 4,036,275 | A | | 7/1977 | Branick | 157/13 |
| 4,112,630 | A | * | 9/1978 | Brown, Jr. | 451/28 |
| 4,116,256 | A | | 9/1978 | Morris et al. | 157/13 |
| 4,486,255 | A | | 12/1984 | Crommelynck et al. | 156/98 |
| 4,663,889 | A | * | 5/1987 | Strand et al. | 451/5 |
| 5,054,971 | A | | 10/1991 | Kieninger et al. | 408/205 |

FOREIGN PATENT DOCUMENTS

| | | |
|---|---|---|
| WO | 0015388 | 3/2000 |

* cited by examiner

*Primary Examiner*—M Rachuba
(74) *Attorney, Agent, or Firm*—Baker Botts LLP

(57) ABSTRACT

A machine for machining and deflashing tire treads, having a frame, a drum for supporting the tire and rotating it about its axis, a cylindrical cutting tool and means for orienting the tool in various directions with respect to the tire, including means allowing rotation of the tire to be reversed and means for arranging the tool to work in two substantially symmetrical positions relative to the tire, a first position for cutting proper and a second position for deflashing, each of said positions corresponding to an opposite direction of rotation of the tire.

5 Claims, 4 Drawing Sheets

MACHINE FOR MACHINING AND DEFLASHING TIRES

BACKGROUND OF THE INVENTION

1. Technical Field of the Intention

The present invention relates to a device for machining viscoelastic products: more precisely, it relates to a machine for machining and deflashing rubber products such as tires.

2. The Related Art

Tires are known to comprise a tread consisting of an outer layer of rubber-based mixtures, of greater or lesser thickness, in which are molded various grooves and tread patterns intended, inter alia, to improve the vehicle's grip relative to the ground.

In certain cases, it is necessary to machine the outer surface of the tire: for example, to prepare for retreading of a worn tire or, indeed, to obtain a "worn" tire from a new tire, with a view to performing certain tests on the rigid belt, or on the carcass, without being hampered by the very considerable heating associated with the thickness of the rubber of the new tread during the tests.

In the first case (retreading), tires are often machined by abrasion (see for example International Publication No. WO 00/15388), but this process causes superficial heating which it is sometimes desirable to avoid. Moreover, a good surface state is sometimes required; a cutting process is then used. In general, the tire is made to turn about its axis and is moved towards the tool by translational movement of part of the frame (see for example U.S. Pat. No. 4,036,275).

The cutting tools used are generally cylindrical, that is to say, the cutting edge of the blade is circular (see for example U.S. Pat. No. 3,426,828 or U.S. Pat. No. 4,036,275) and the cut material passes inside the cylindrical tool and is discharged in the form of a strip.

When a patterned tire tread is machined by a cutting process, the formation of flash is noted to the rear of the tool at the edges of the grooves in the tire. Until now, this flash did not constitute a particular problem, but, confronted with increased quality requirements and the increasing severity of tests, it has become necessary to remove this flash in certain cases.

The invention relates to a machine for machining and for deflashing tire treads after a cutting machining operation which allows the same machine to be used for cutting and deflashing without having to remove the tire.

SUMMARY OF THE INVENTION

According to the invention, a machine for machining and deflashing tire treads comprises a frame, a drum for supporting the tire and rotating it about its axis, a cylindrical cutting tool and means for orienting the tool in various directions with respect to the tire, and further comprises means allowing rotation of the tire to be reversed and means for arranging the tool to work in two substantially symmetrical positions relative to the tire, a first position for cutting proper and a second position for deflashing, each of said positions corresponding to an opposite direction of rotation of the tire.

The machine according to the invention thus has the advantage of ensuring deflashing of the tire while retaining excellent machining precision. This is a substantial advantage over a machine which would require turning the tire round on its axis and causing it to turn in the reverse direction in front of the same tool, because removing and replacing the tire on its drum would involve loss of tire machining precision.

In a preferred variant, the tool comprises two circular cutting edges, each capable of occupying one of the two symmetrical positions.

Preferably, in the first position, the tool exhibits a cutting angle alpha and the tire an appropriate direction of rotation and, in the second position, the tool exhibits a cutting angle minus alpha and the tire the opposite direction of rotation to the above.

In another preferred variant, the cutting edge of the tool comprises at least one notch, that is to say, a portion having a lower axial length. This allows automatic division of the strip of cut material into shorter pieces and the prevention of jamming.

Of course, the machine according to the invention may be used in the conventional manner, that is to say, with a single machining stage, without then switching tool position and reversing tire rotation This is the case, for example, when the tire is being completely stripped of tread and there will not therefore be any flash to remove.

BRIEF DESCRIPTION OF THE DRAWINGS

An example of an embodiment of the improved machine for machining and deflashing tire treads according to the invention will be described, in non-limiting manner, with reference to the attached drawings, in which.

DESCRIPTION OF EXEMPLARY EMBODIMENT

Figure 1:
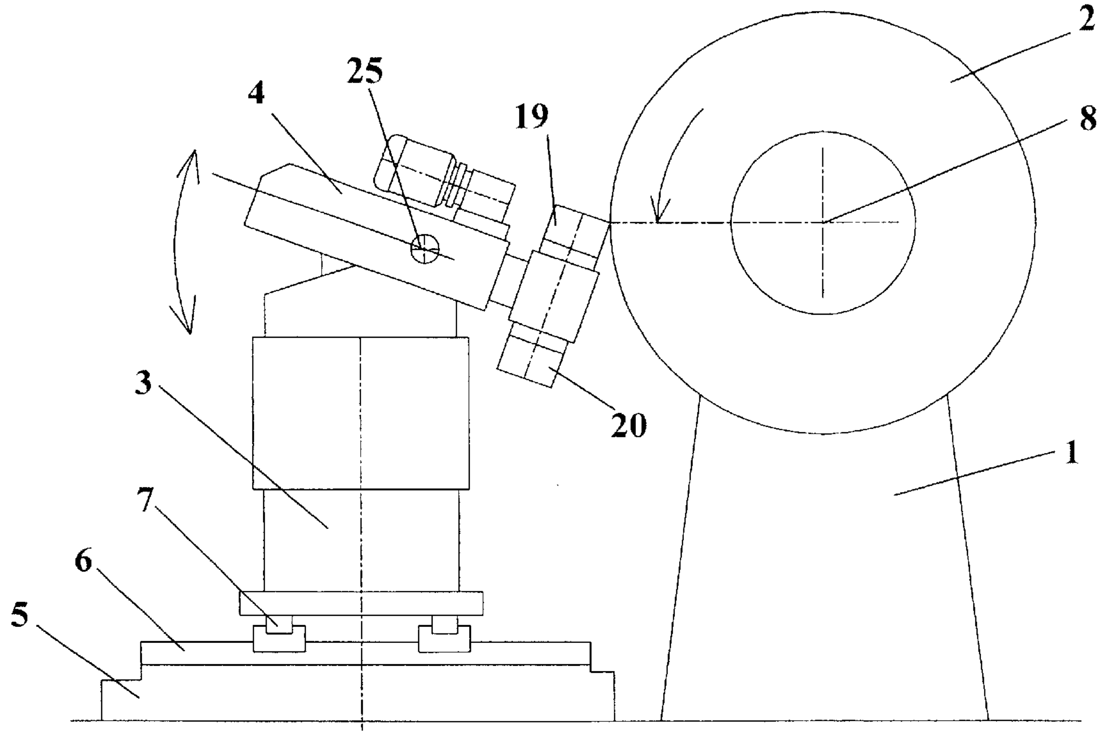
FIG. 1 is a schematic view of a tire machining and deflashing machine according to the invention.

FIG. 1 is a highly schematic view of a machine for machining tire treads according to the invention. The machine comprises a first fixed frame 1 supporting a drum (not shown) on which is mounted a tire 2. The machine also comprises a mobile frame 3 supporting a tool holder 4. The frame 3 is mounted on a fixed base 5 by means of two pairs of horizontal rails 6 and 7. The rails 6 are oriented perpendicularly to the axis of rotation 8 of the tire and permit translational movement of the frame 3 towards or away from the tire 2. The rails 7 are oriented parallel to the axis of rotation 8 of the tire 2 and permit translational displacement of the frame 3 parallel to the axis of rotation of the tire 2. The combination of these two translational movements allows the cutting tool to follow all the conventional tire profiles. The frame 3 also allows vertical displacement of the tool holder 4, due to conventional means which are not shown. The machine additionally comprises means (not shown) of setting the tire 2 in rotation, of reversing its direction of rotation and of controlling the displacements of the mobile frame 3 and the vertical position of the tool holder 4. Such means are also conventional.

The tool holder 4 is intended to hold a cutting tool comprising two cylindrical cutting tools 19 and 20. FIG. 1 shows the tool 19 in position for machining the tire 2. The tool holder 4 may swing vertically about the horizontal axis 25 in order, as described below, to bring the cutting edge of the tool 20 into contact with the tire 2.

Figure 2A:
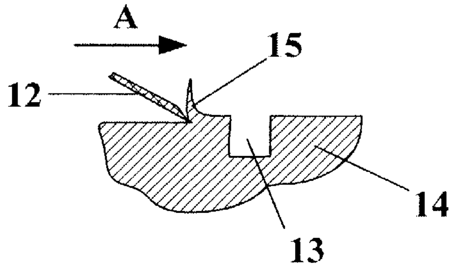
FIGS. 2*a* and 2*b* show schematically the formation of flash during machining of the tread of a tire.
Figure 2B:
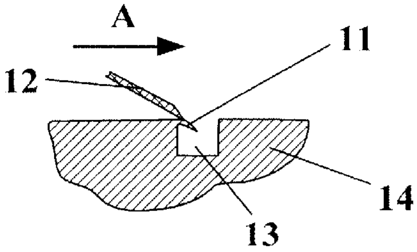

FIGS. 2*a* and 2*b* show schematically the formation of flash 11 when the cutting edge of a cutting tool 12 arrives on a level with a groove 13 in the tread 14 of the tire. FIG. 2*a* shows a cutting tool moving in the direction of arrow A relative to a groove 13 in the tread of the tire. As the groove 13 is still at a distance from the cutting tool 12, the latter easily severs the strip 15 from the surface of the tread 14. On the other hand, FIG. 2*b* shows that, when the cutting tool 12 passes thereover, the edge of the groove 13 bends under the action of said tool 12 and moves out of the way without being cut, giving rise to flash 11. The plasticity of the material no longer offers sufficient resistance to the tool to ensure a clean cut. When a very good surface state is desirable, it is necessary to remove this flash. The deflashing operation could be performed manually, if there is only a little deflashing required, or by turning the tire 2 round on its drum and making it turn in the opposite direction in front of the same cutting tool, which would allow the flash to be picked up from the opposite direction and severed. However, it will be understood that this process requires time for removing and replacing the tire and that it causes offsets or misalignments which, even when slight, detract from the precision of the surface state of the machined tread.

According to the invention, the tool holder 4 allows a cutting tool to be presented in two symmetrical positions relative to the tire.

Figure 3:
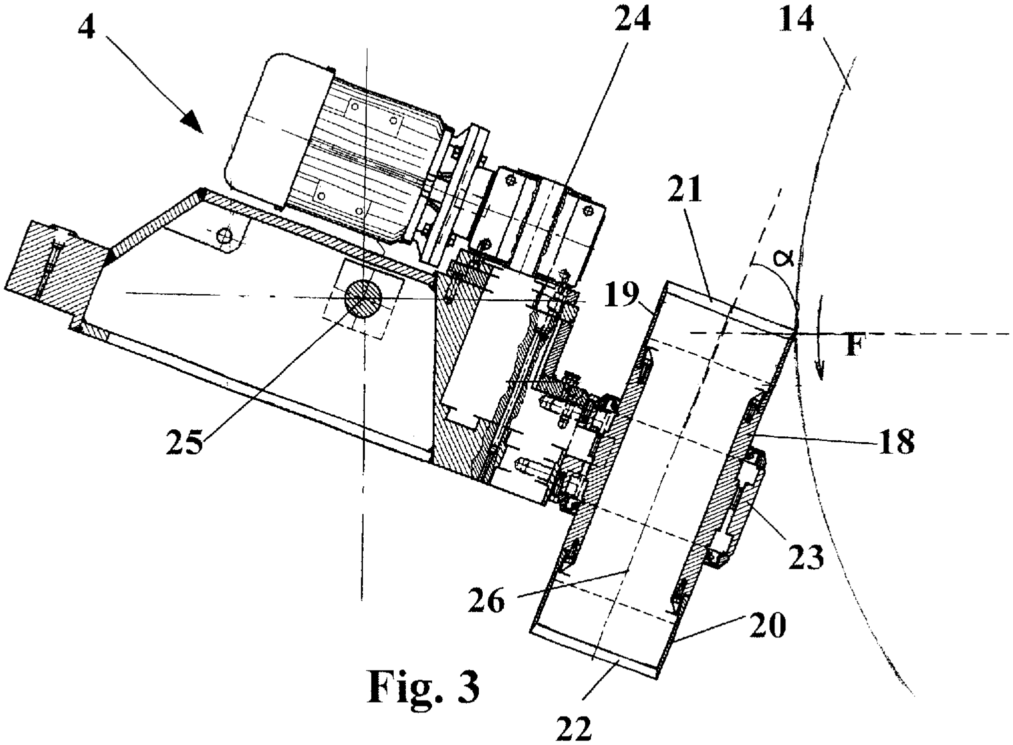
FIG. 3 is a view of the tool holder of a machine according to the invention, in the machining position.
Figure 4:
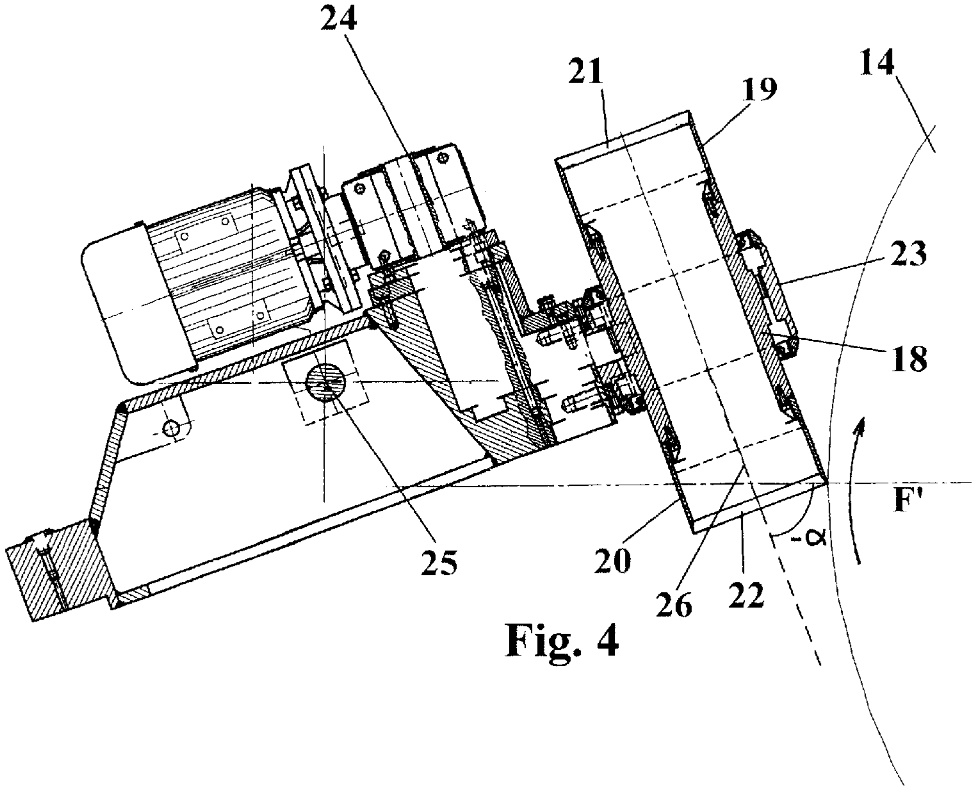
FIG. 4 is a view similar to FIG. 3, in which the tool holder is in the deflashing position.

In a preferred variant of the invention illustrated in FIGS. 3 and 4, two tools 19 and 20 are used, each comprising a circular cutting edge 21 and 22 and mounted opposite one another. These tools are fixed in a support 18 driven in rotation about its axis 26, in a ball cage 23, by a geared motor unit 24. Rotation of the cutting tools about their axis 26 facilitates machining and deflashing of the tire. It also increases the service life of the cutting edges between two sharpening operations.

The tool holder assembly 4 is mounted rotationally about a horizontal axis 25 substantially parallel with that of the tire, which allows adjustment (due to means which are not shown) of the cutting angle $\alpha$ or $-\alpha$ of the tool 19 or 20. The cutting angle $\alpha$ is defined as the angle between the line normal to the tread at the point of contact and the axis of rotation 26 of the tools 19 and 20.

FIG. 3 shows the tool 19 in position for machining the tread 14 of the tire 2 (cutting edge 21 in action), while FIG. 4 shows the tool 20 in the deflashing position (cutting edge 22 in action). According to the invention, between the two stages the tool holder 4 has been swung about the axis 25, the vertical and horizontal positions of the tool holder 4 have, if necessary, been adjusted relative to the tread 14 of the tire 2, and the direction of rotation of the tire 2 has been reversed (arrows F and F'). The cutting angle is then $-\alpha$.

It will be seen that, in addition to the substantial advantage of the invention, i.e. the fact that it is not necessary to turn the tire around on its drum, an important advantage of this variant resides in the fact that, by virtue of the two cutting edges of the cutting tool, the tool is set very rapidly and very easily in action, and moreover with maximum precision. This results in an extremely precise tread surface state.

According to the invention, the two positions of the tool (shown in FIGS. 3 and 4) are symmetrical relative to the tire, i.e., in the two stages, small and substantially equal cutting angles $\alpha$ and $-\alpha$ are used. It will be noted, however, that the point of application of the cutting tool on the surface to be machined may be slightly different. Without entering into detail about technology which is well known, the assembly of mechanical means described above allows extremely precise adjustment of the tool position.

The cutting tools 19 and 20 may be cylindrical tools with a circular cutting edge, as described in U.S. Pat. No. 4,036,275, the disclosure of which is hereby incorporated herein by reference.

Figure 5:
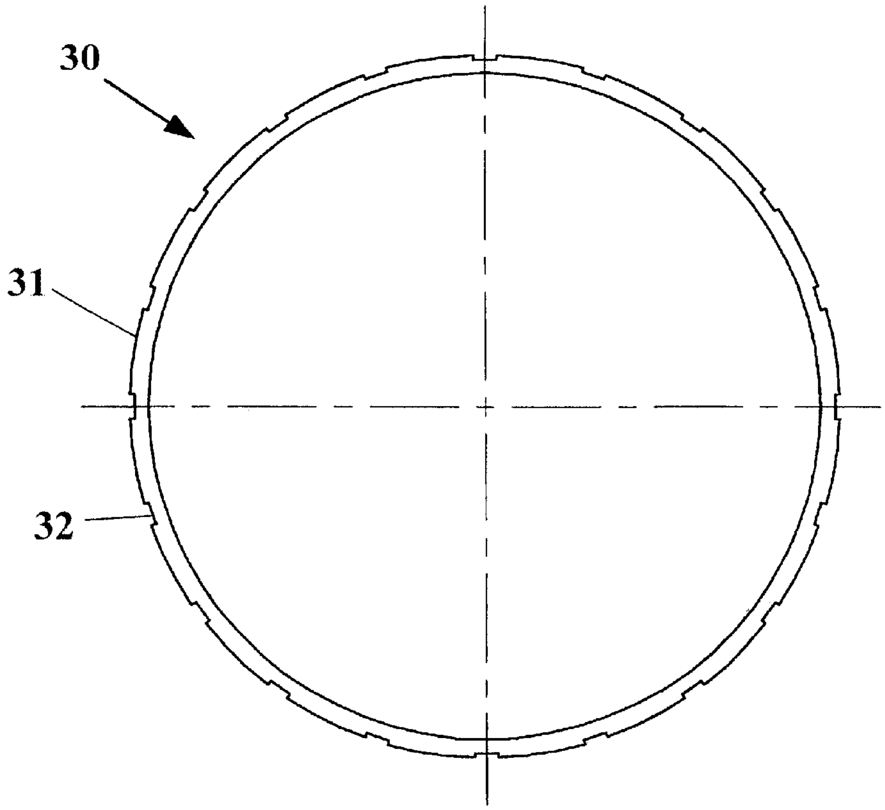
FIG. 5 is a view from above of an embodiment of a cylindrical tool.
Figure 6:
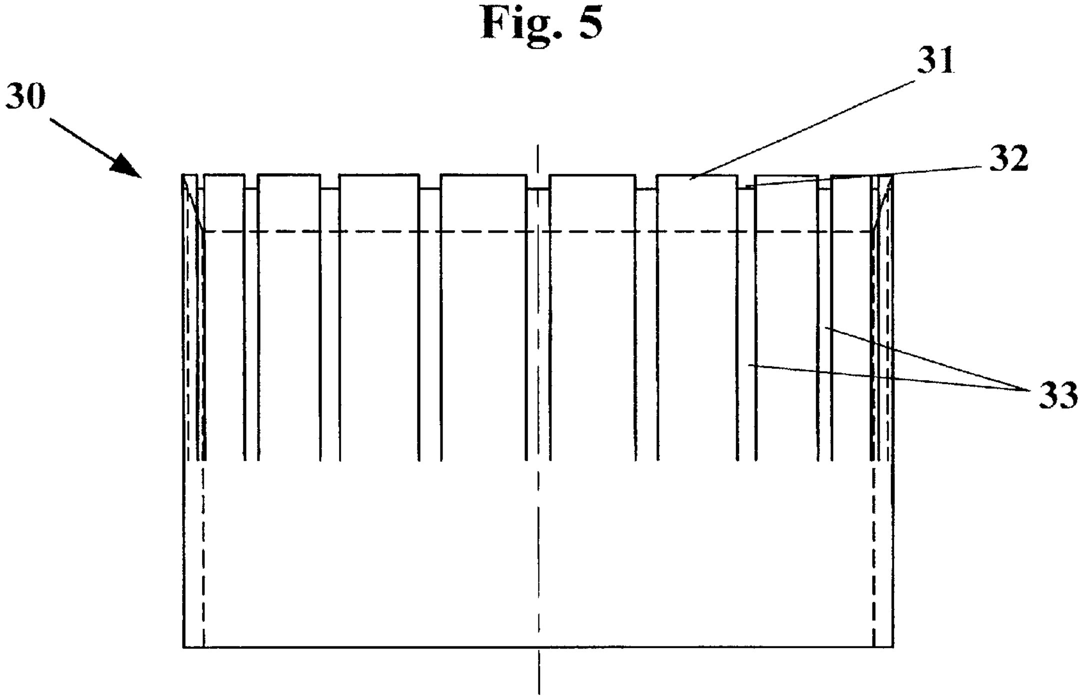
FIG. 6 is a view from the side of the tool of FIG. 5.

FIGS. 5 and 6 show a preferred variant of a cutting tool according to the invention. The tool 30 is shown in a view from above in FIG. 5 and from the side in FIG. 6. It comprises a cutting edge 31 having a plurality of notches 32, that is to say, a lower axial height, i.e., zones having a shorter axial length (see FIG. 6). The notches are preferably disposed in regular manner all round the cutting edge of the tool. The notches may be obtained simply by machining into the cylindrical surface of the tool situated on the same side as the cutting edge longitudinal grooves which open in the cutting edge in the form of said notches. In FIG. 6, it may be seen that the cutting edge of the tool is disposed externally and thus the grooves are themselves also effected externally.

In operation, the notches 32 allow the cut rubber strip to be divided into short portions and thus prevent a jam from forming in the cutting path.

The tool diameter may be of the order of 150 mm for example.

With a speed of tire rotation of the order of 100 to 500 rev/min, a diameter of the order of 1 m and a speed of tool rotation of the order of 55 rev/min, portions are obtained which are approximately 50 cm in length, instead of several meters.

Figure 7:
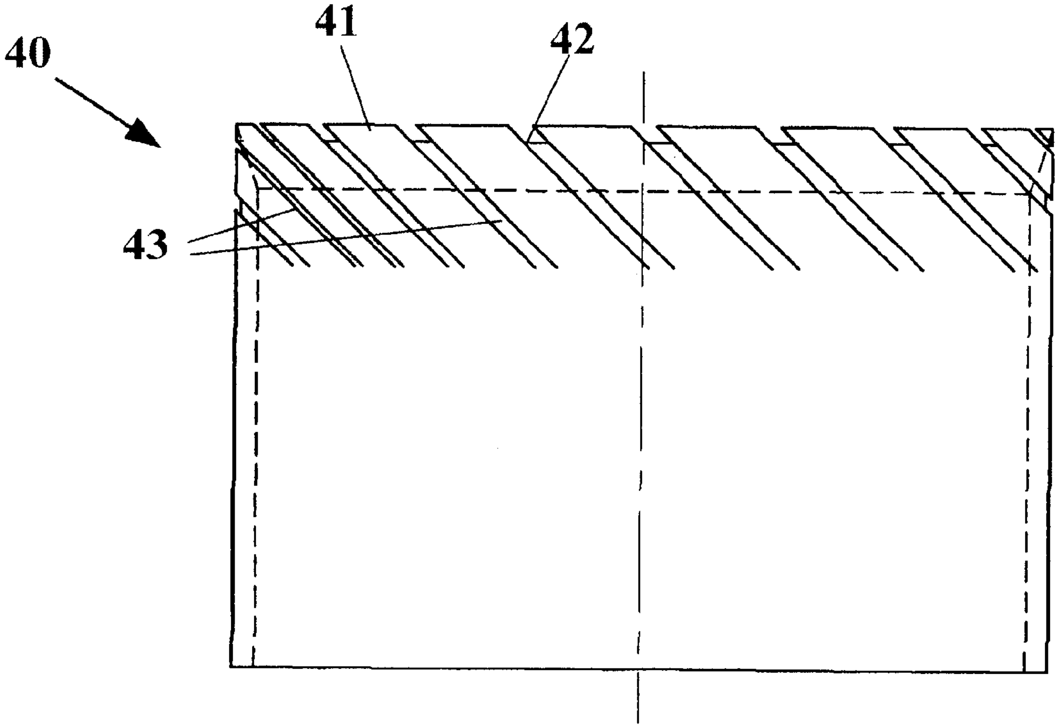
FIG. 7 is a view from the side of another embodiment of a cylindrical tool.

FIG. 7 shows a second variant 40 of a cutting tool according to the invention. In this variant, it may be seen that the grooves 43 are helical instead of axial. Each notch 42 thus has inclined edges instead of normal edges, as is the case with the tool 30. This effectively provides the cutting edge 41 of the tool 40 with a leading edge and a trailing edge, which may facilitate severing of the cut strips.

What is claimed is:

1. A machine for machining and deflashing tire treads, comprising a frame, a drum for supporting the tire and rotating it about its axis, a cylindrical cutting tool and means for orienting the tool in various directions with respect to the tire, and further comprising means for allowing rotation of said tire to be reversed, and means for arranging said tool to work in two substantially symmetrical positions relative to the tire, a first position for cutting proper and a second position for deflashing, each of said positions corresponding to an opposite direction of rotation of the tire.

2. A machine for machining and deflashing tire treads according to claim 1, in which said cutting tool comprises two circular cutting edges, each capable of occupying one of the two symmetrical positions.

3. A machine for machining and deflashing tire treads according to claim 2, in which, in the first position, the tool exhibits a cutting angle alpha and the tire an appropriate first direction of rotation and, in the second position, the tool exhibits a cutting angle minus alpha and the tire the opposite direction of rotation to the first direction.

4. A machine for machining and deflashing tire treads according to claim 2, in which each cutting edge of the tool comprises at least one notch.

5. A machine for machining and deflashing tire treads according to claim 4, in which said at least one notch is formed by a groove in the cylindrical surface of the cutting tool, said groove having a lower axial height than that of said cutting edge.

* * * * *